US009828292B2

(12) United States Patent
Ulrike et al.

(10) Patent No.: US 9,828,292 B2
(45) Date of Patent: Nov. 28, 2017

(54) BINDER COMPOSITION FOR IMPROVED MORTARS AND COATINGS

(71) Applicant: S. A. Lhoist Recherche et Developpement, Ottignies-Louvain-la-neuve (BE)

(72) Inventors: Peter Ulrike, Ixelles (BE); Daniel Daviller, Chattilon-le-Duc (FR)

(73) Assignee: S. A. Lhoist Recherche et Developpement, Ottignies-Louvain-la (BE)

( * ) Notice: Subject to any disclaimer, the term of this patent is extended or adjusted under 35 U.S.C. 154(b) by 0 days.

(21) Appl. No.: 15/039,931

(22) PCT Filed: Dec. 4, 2014

(86) PCT No.: PCT/EP2014/076504
§ 371 (c)(1),
(2) Date: May 27, 2016

(87) PCT Pub. No.: WO2015/082585
PCT Pub. Date: Jun. 11, 2015

(65) Prior Publication Data
US 2017/0022110 A1  Jan. 26, 2017

(30) Foreign Application Priority Data

Dec. 6, 2013 (BE) .................... 2013/0819

(51) Int. Cl.
| C04B 28/10 | (2006.01) |
| C04B 2/06 | (2006.01) |
| C04B 20/00 | (2006.01) |
| C04B 14/06 | (2006.01) |
| C04B 103/30 | (2006.01) |
| C04B 103/46 | (2006.01) |
| C04B 111/00 | (2006.01) |

(52) U.S. Cl.
CPC ............... C04B 28/10 (2013.01); C04B 2/06 (2013.01); C04B 14/06 (2013.01); C04B 20/008 (2013.01); *C04B 2103/304* (2013.01); *C04B 2103/46* (2013.01); *C04B 2111/00646* (2013.01)

(58) Field of Classification Search
CPC ......... C04B 28/10; C04B 2/06; C04B 20/008; C04B 14/06; C04B 2103/304; C04B 2103/46; C04B 2111/00646
USPC .......................................................... 524/5
See application file for complete search history.

(56) References Cited

U.S. PATENT DOCUMENTS

| 6,913,644 B2 * | 7/2005 | Rizza ..................... C04B 18/248 106/730 |
| 8,043,425 B2 * | 10/2011 | Garcia ................ C04B 22/0026 106/705 |
| 2014/0121303 A1 * | 5/2014 | Hagen .................... C04B 20/10 524/5 |

FOREIGN PATENT DOCUMENTS

| DE | WO 2008034616 A1 * | 3/2008 | .......... C04B 22/064 |
| DE | 2404885 A2 * | 1/2012 | ............. C04B 28/10 |
| EP | 1406849 A1 | 4/2004 | |
| EP | 2404885 A2 | 1/2012 | |
| WO | 20088034618 A1 | 3/2008 | |

OTHER PUBLICATIONS

Ferraris et al. "Particle Size and Surface Area by Laser Diffraction", National Cooperative Highway Research Program, Apr. 30, 2013, pp. 1-A12, URL:http://onlinepubs.trb.org/onlinepubs/nchrp/nch.rp_rrd_382.pdf [retrieved on Oct. 9, 2014].*
2014/076504, EP, Jan. 29, 2015, Lhoist Recherche, International Search Report.
2014/076504, EP, Lhoist Recherche, Written Opinion of the ISA.

* cited by examiner

*Primary Examiner* — Michael M Bernshteyn
(74) *Attorney, Agent, or Firm* — Whitaker Chalk Swindle & Schwartz PLLC; Charles D. Gunter, Jr.

(57) ABSTRACT

A binder composition for enhanced mortars and coatings, comprising a first conventional mineral component and a second component based on powdery slaked lime, wherein said second component based on powdery slaked lime has a specific surface area calculated according to the BET method of less than 12 $m^2/g$, advantageously less than 11 $m^2/g$, in particular less than 10 $m^2/g$, preferably less than 9 $m^2/g$ and its uses as well as the enhanced coating or mortar systems comprising an aggregate of the mineral type and the aforesaid composition.

26 Claims, No Drawings

BINDER COMPOSITION FOR IMPROVED MORTARS AND COATINGS

BACKGROUND OF THE INVENTION

1. Field of the Invention

The present invention relates to a binder composition for mortars and enhanced coatings, comprising a first conventional mineral component and a second component based on powdered slaked lime.

2. Description of the Prior Art

By the term of <<mortar>> is meant in the sense of the present invention, a mixture of one or several mineral binders like lime, a cement or the like and of aggregates, mainly sand; this is then a traditional mortar. Such a mortar is used in building for binding and/or for covering the building elements and may also contain fillers, one or several organic binders, additives and/or adjuvants. A mortar with high added value or highly added, for which the composition and the manufacturing are defined in order to obtain specific properties, may be described as enhanced or performing or further formulated (designed mortar). Are notably included therein adhesive mortars, self-leveling floors, screeds, repair mortars, certain masonry mortars, etc. . . .

By the term of <<coating>>, is meant a mortar composition intended to be applied as a layer in one or several passes. A coating is therefore a mortar for outdoor surface application (render) or indoor surface application (plaster).

The mortars and coatings may be made up from formulations of binders with hydraulic, pozzolanic or air setting, or from their mixture. The use of air lime or slaked lime has advantages as compared with binders without lime: better plasticity having as a result better handling capability/applicability, better retention of water which allows improved tolerance towards variations in the porosity of the support, better permeability to water vapor, and better flexibility of the cured system.

Moreover, it is well known that in enhanced (also called performing or formulated) mortars and coatings, the addition of additives, notably organic additives, is a preferred method for purposes of optimizing application performances.

Slaked lime consists of a set of solid particles, mainly calcium di-hydroxide of formula $Ca(OH)_2$, and is the industrial result of slaking of quick lime with water, in a reaction also called a hydration. This product is also known as hydrated lime or air lime and typically has BET surface areas of the order of 15 to 20 $m^2/g$ (J. A. H. Oates, *Lime and Limestone—Chemistry and Technology, Production and Uses*, 1998, p. 220).

This slaked or hydrated lime or air lime or calcium hydroxide may of course contain impurities, i.e. phases derived from $SiO_2$, $Al_2O_3$, $Fe_2O_3$, MnO, $P_2O_5$, $K_2O$ and/or $SO_3$, globally representing a few tens of grams per kilogram. Nevertheless, the sum of these impurities, expressed as the aforementioned oxides, does not exceed 5% by mass, preferably 3%, preferably 2% or even 1% of the mass of the slaked lime according to the invention. In particular, the slaked lime advantageously contains less than 1.5% by mass of $Fe_2O_3$, preferably less than 1% and preferably less than 0.3%.

Such slaked lime may contain magnesium oxide and/or hydroxide. Depending on the contents of these compounds, the lime will be referred to as magnesium, dolomitic or dolomite lime, either partly or totally slaked.

This slaked lime may also contain calcium oxide which would not have been hydrated during the slaking or stemming from non-uniform baking (localized over-baking), just as it may contain calcium carbonate $CaCO_3$ or magnesium carbonate $MgCO_3$. These carbonates may stem either from the initial limestone (or from the crude dolomite), from which is derived the slaked lime according to the invention (not baked), or from a partial carbonation reaction of the slaked lime in contact with air. The calcium oxide content in the slaked lime within the scope of the present invention is generally less than 5% by mass, preferably less than 2% and advantageously less than 1%. That of carbonates is less than 10% by mass, preferably less than 6% and advantageously less than 4%, still more advantageously less than 3%.

In the technical field of lime mortars and coatings, with the purpose of improving the aforementioned properties, existing teachings for example propose operating on the specific surface area and in reality disclose many results quite different from each other.

For example, document WO 2008034616 discloses that it is possible to accelerate the development of compressive forces of binder compositions with hydraulic setting by adding lime with a particular specific surface area.

The targeted specific surface area in this document is comprised between 7 and 16 $m^2/g$ and the preferential embodiments are directed to slaked limes having a specific surface area comprised between 11 and 14 $m^2/g$ for lime contents of about 5% by weight based on the total weight of the binder (Portland cement).

Document BE 1006309 as for it teaches the use of a method for increasing the specific surface area and the plastic properties of the hydrated lime, in particular with a chemical modification agent in order to give it a much higher specific surface area. This object of this invention is further a hydrated lime having a much greater capability of retaining water and of becoming more plastic. In this way, the thereby produced slaked lime may be used in mortars in smaller proportions while allowing the latter to retain the workability required by codes or standards.

According to document DE 102005018100, calcium hydroxide with great fineness is used for producing hydraulic mortars or binders for producing concretes having improved flow and setting characteristics. This calcium hydroxide with great fineness typically has both high BET and Blaine specific surface areas.

Further, document WO 9209528 provides the use of calcium hydroxide or slaked lime as milks or slurries of $Ca(OH)_2$ and/or $Ca(OH)_2$—$Mg(OH)_2$ in the building industry for making mortars, coatings, etc. . . . This document teaches that the quality of the $Ca(OH)_2$ milks and/or slurries, optionally mixed with $Mg(OH)_2$, and their property, for example their reactivity, depend on the dimension and the structure of the agglomerates or micelles of suspended $Ca(OH)_2$ and/or $Ca(OH)_2$—$Mg(OH)_2$. The conclusion of this document is in reality that the particles of $Ca(OH)_2$ and/or $Ca(OH)_2$—$Mg(OH)_2$ of the agglomerates or micelles should have a small grain size and large porosity in order to obtain a highly reactive milk or slurry and for reducing or avoiding sedimentation of the particles. Still according to this document, in the case of slurries, with a small grain size and large porosity it is possible to obtain mortars having high plasticity and a high power of retaining water.

Accordingly, it appears that, with the purpose of having the high plasticity required of coatings and enhanced mortars, as well as the water retention power required for application on any type of surface, a slaked lime with a high specific surface area must rather be selected.

In spite of the aforementioned advantages, the use of binders based on slaked lime also generates some drawbacks such as for example the requirement of using high contents of organic additives typically present in the enhanced mortars and coatings and for which the role is to ensure specific functions such as retention of water, management of the flow properties (handling capability/plasticity, castability, flow threshold, . . . ), adherence, abrasion resistance, hydrophobicization or further air entrainment.

SUMMARY OF THE INVENTION

The present invention aims at preserving the aforementioned advantages of the compositions of binders based on slaked lime, while suppressing some of their drawbacks outlined above or further by improving the properties of mortars prepared initially from these formulations.

In order to solve this problem, a binder composition as indicated in the beginning is provided according to the invention, wherein said second component based on powdery slaked lime has a specific surface area calculated according to the BET method of less than 12 $m^2/g$, in particular less than 11 $m^2/g$, advantageously less than 10 $m^2/g$, preferably less than 9 $m^2/g$.

The specific surface area of the slaked lime according to the present invention is measured by nitrogen adsorption manometry and calculated according to the BET method, after degassing in vacuo at 190° C. for at least 2 hours.

It is important not to confuse BET specific surface area, as measured by nitrogen adsorption or desorption after degassing, with Blaine specific surface area, measured by perviousness to air. Indeed, the BET method gives the possibility of determining the whole of the specific surface area of a compound, by taking notably into account its porosity, and is not directly dependent on the size of the constitutive particles, while the Blaine method gives the possibility of exclusively determining the outer surface area of the particles of this compound and directly depends on the size of the latter. (Allan T., Particle Size Measurement, Vol. 2, Surface area and pore size determination, fifth edition, 1997, page 11, page 39).

The binder composition according to the present invention, when it is used in <<enhanced>> or <<performing>> mortars or <<with high added value>> or in highly additived coatings, gives the possibility of benefitting from positive effects of the slaked lime while maintaining the functionalities of the organic additives such as, water retention, handling capability/flow properties, air entrainment, adherence, abrasion resistance and hydrophobicization. Indeed, because of the particular specific surface area of the slaked lime of the present invention, the adsorption of these organic additives in the pores of the slaked lime particles is strongly reduced. Further, the impact on the cost of the binding composition or that of mortars and coatings produced from the latter is of particular interest.

Indeed, in enhanced coatings and enhanced mortars with high content of organic additives, like adhesive mortars, self-smoothing floorings, repair mortars, and certain masonry mortars with high added value, the binder composition according to the present invention, containing slaked lime with low specific surface area, gives the possibility of reducing the interaction of the latter with the organic additives, and accordingly reducing the risks of inhibiting their functionality in the mortar which therefore avoids having to significantly increase the content of these additives in the compositions of <<enhanced>> or <<performing>> or <<formulated>> mortars and coatings.

Moreover, the binder composition according to the present invention also gives the possibility to the enhanced coatings and mortars obtained from the latter to retain advantageous properties of plasticity and water retention. This effect is particularly unexpected since up till now such characteristics only seem to be able to be obtained by means of slaked lime with a high specific surface area.

Advantageously, said second component based on powdery slaked lime has a specific surface area calculated according to the BET method of less than 8.5 $m^2/g$ preferably less than 8 $m^2/g$, preferentially less than 7.5 $m^2/g$ and in particular less than 7 $m^2/g$.

DETAILED DESCRIPTION OF THE INVENTION

In a particular embodiment, said first conventional mineral component is selected from the group consisting of cements, standard slaked or hydrated lime, air lime, natural or artificial hydraulic lime, binders for masonry, pozzolanic and hydraulic binders, gypsum and mixtures thereof.

In a particular embodiment, said cements are selected from the group of common cements (gray or white), refractory cements, molten aluminous, prompt cements, Portland cements, slags from blast furnaces, fly ash and mixtures thereof.

Preferably, said second component is present in an amount equal to or greater than 12% by weight, preferably equal to or greater than 15% by weight, particularly equal to or greater than 20% by weight, in particular equal to or greater than 30% by weight, advantageously equal to or greater than 40% by weight and equal to or smaller than 80% by weight, in particular equal to or smaller than 70% by weight, advantageously equal to or smaller than 60% by weight, based on the total weight of said binder composition.

Lower contents of said second component in said binder composition would not give the possibility of either benefiting from the advantages of slaked lime as mentioned above or of demonstrating the drawbacks related to the use of the latter and which the present invention precisely seeks to solve.

In a more particular way, said second component has particles having a $d_3$ greater than 0.1 µm, in particular greater than 0.5 µm and a $d_{98}$ of less than or equal to 250 µm, preferably less than or equal to 200 µm.

The notation $d_x$ represents a diameter, expressed in µm, relatively to which X % of the measured particles or grains are smaller.

In a particularly advantageous embodiment according to the present invention, said second component has particles having a $d_{93}$ of less than or equal to 90 µm.

In a preferential embodiment according to the present invention, said second component based on powdery slaked lime has a total pore volume calculated according to the nitrogen desorption BJH method of more than or equal to 0.02 $cm^3/g$, preferably more than or equal to 0.025 $cm^3/g$.

Advantageously, said second component based on powdery slaked lime has a total pore volume calculated according to the nitrogen desorption BJH method of less than or equal to 0.07 $cm^3/g$, preferably less than or equal to 0.06 $cm^3/g$.

By <<total pore volume>> in the sense of the present invention is meant the total volume of the pores for which the size is comprised between 17 and 1,000 Å (1.7 and 100 nm), measured by nitrogen adsorption manometry and calculated according to the BJH method, after degassing in vacuo at 190° C. for at least 2 hours.

Advantageously, said second component based on slaked lime has a bulk density as measured according to the EN 459-2 standard of more than 350 kg/m$^3$, preferably more than 400 kg/m$^3$ and less than 600 kg/m$^3$, in particular less than 550 kg/m$^3$.

Preferentially, the composition according to the present invention further comprises an air entrainer such as a surfactant or tenside, in particular selected from the group of alkyl sulfates or sulfonates, ethoxylated fatty alcohols, block copolymers and mixtures thereof.

In an alternative according to the invention, the binder composition may further comprise one or several water retaining agents, for example cellulose ethers or guar gums, derivatives thereof and mixtures thereof.

In further another alternative according to the present invention, the binder composition further comprises a rheology modifier, in particular selected from the group of hydrocolloids, more particularly form the group of polysaccharides, starch derivatives, alginates, guar gums and derivatives thereof, xanthan gums and derivatives thereof, carrageenan gums and derivatives thereof, succinoglycans, superplasticizers like polycarboxylates or melamine-formaldehydes, mineral colloids, in particular silica and clays, and mixtures thereof.

Advantageously, the composition according to the invention further also comprises a hydrophobicizing agent selected from the group of fatty acid salts such as stearates and oleates, vegetable and mineral oils, silanes, siloxanes and mixtures thereof.

Particularly advantageously, the composition according to the present invention further comprises a third organic component selected from the group of industrial lattices such as for example polyvinyl acetate/ethylene copolymers, polyvinyl acetate/versatate copolymers, styrene/butadiene copolymers and the like.

Other embodiments of the binder composition for enhanced coatings and mortars according to the invention are indicated in the appended claims.

The object of the invention is also a system of enhanced coatings or mortars comprising an aggregate of the mineral type and the composition according to the present invention, as mentioned above.

The binder composition for mortars and coatings comprises a first conventional mineral component and a second component based on powdery slaked lime. Said second component based on powdery slaked lime has a specific surface area calculated according to the BET method, of less than 12 m$^2$/g, in particular less than 11 m$^2$/g, advantageously less than 10 m$^2$/g, preferably less than 9 m$^2$/g.

Advantageously, said second component has a specific surface area calculated according to the BET method of less than 8.5 m$^2$/g, preferably less than 8 m$^2$/g, preferentially less than 7.5 m$^2$/g and in particular less than 7 m$^2$/g.

In a particular embodiment, said first conventional mineral component is selected from the group consisting of cements, of standard slaked or hydrated lime or air lime, natural or artificial hydraulic lime, binders for masonry, pozzolanic and hydraulic binders, gypsum and mixtures thereof.

Advantageously, the cements are selected from the group of common cements (gray or white), refractory cements, molten aluminous cements, prompt cements, Portland cements, slags from blast furnaces, fly ash and mixtures thereof.

Preferably, said second component is present in an amount equal to or greater than 12% by weight, preferably equal to or greater than 15% by weight, particularly equal to or greater than 20% by weight, in particular equal to or greater than 30% by weight, advantageously equal to or greater than 40% by weight and equal to or less than 80% by weight, in particular equal to or less than 70%, in particular equal to or less than 60% by weight, based on the total weight of said binder composition.

More particularly, said second component has particles having a $d_3$ greater than 0.1 μm, in particular greater than 0.5 μm and a $d_{98}$ of less than or equal to 250 μm, preferably less than or equal to 200 μm.

In a particularly advantageous embodiment according to the present invention, said second component has particles having a $d_{93}$ of less than or equal to 90 μm.

In a preferential embodiment according to the present invention, said second component based on powdery slaked lime has a total pore volume calculated according to the nitrogen desorption BJH method greater than or equal to 0.02 cm$^3$/g, preferably greater than or equal to 0.025 cm$^3$/g.

Preferably, said second component based on powdery slaked lime has a total pore volume calculated according to the nitrogen desorption BJH method of less than or equal to 0.07 cm$^3$/g, preferably less than or equal to 0.06 cm$^3$/g.

In a preferential embodiment according to the present invention, the system as mentioned above is in a dry form, ready to mix with water.

In an alternative according to the present invention, the system further comprises water and is thus in a ready-to-use form.

Advantageously, said system according to the invention further comprises an air entrainer such as a surfactant or tenside, in particular selected from the group of alkyl sulfates or sulfonates, ethoxylated fatty alcohols, block copolymers and mixtures thereof, which may be added to the aggregate, to the binder composition or to the system after or during the mixing of said binder composition and of the aggregates.

In a particular embodiment of the present invention, the system further comprises one or several water retaining agents, for example cellulose ethers or guar gums, derivatives thereof and mixtures thereof, which may be added to the aggregate, to the binder composition or to the system after or during the mixing of said binder composition and of the aggregates.

In another preferred embodiment of the invention, the system further comprises a rheology modifier, in particular selected from the group of hydrocolloids, more particularly from the group of polysaccharides, starch derivatives, alginates, guar gums and derivatives thereof, xanthan gums and derivatives thereof, carrageenan gums and derivatives thereof, succinoglycans, superplasticizers like polycarboxylates or melamine formaldehydes, mineral colloids, in particular silica and clays, and mixtures thereof, which may be added to the aggregate, to the binder composition or to the system after or during the mixing of said binder composition and of the aggregates.

In further another preferred embodiment of the invention, the system further comprises a hydrophobicizing agent selected from the group of fatty acid salts like stearates and oleates, vegetable and mineral oils, silanes, siloxanes and mixtures thereof, which may be added to the aggregate, to the binder composition or to the system after or during mixing of said binder composition and of the aggregates.

In a preferential embodiment of the invention, the system further comprises a third organic binder selected from the group of industrial lattices based on polyvinyl/ethylene, polyvinyl acetate/versatate, styrene/butadiene copolymers and the like, which may be added to the aggregate, to the binder composition or to the system after or during the mixing of said binding composition and of the aggregates.

Other embodiments of the system of enhanced coatings or mortars comprising an aggregate of the mineral type according to the invention are indicated in the appended claims.

The invention also relates to a use of a binder composition according to the present invention in an enhanced coating.

The invention also relates to a use of a binder composition according to the present invention, in an enhanced mortar.

Advantageously, said use resorts to aggregates which have a particle size such that $d_5$ is greater than or equal to 63 µm and $d_{98}$ is less than or equal to 4 mm.

Other embodiments of use of the composition are mentioned in the appended claims.

Other features, details and advantages of the invention will become apparent from the description given hereafter, as non-limiting and with reference to the examples.

EXAMPLES

Example 1.—: Impact of Hydrated Lime with a Low Specific Surface Area in a Coating The binder composition for a coating with high added value mentioned in table 1 was prepared with the following components and in the indicated proportions:

TABLE 1

| Products | Proportion (% by weight) |
| --- | --- |
| Cement CEM I 42.5 R | 51% |
| Hydrated lime | 47% |
| Reidispersible latex powder (Vinnapas 8031 H) | 0.4% |
| Water retainer (Tylose MH 15000 YP4) | 0.5% |
| Air entrainer (Hostapur OSB) | 0.1% |
| Hydrophobicizer (Zinkum 5) | 1% |

In this formulation, a lime with a high specific surface area (HS) is compared with two limes of low specific surface area (BS), and a standard lime (STD) of a standard specific surface area, according to table 2.

By the expression of "specific surface area" used in the present invention, is meant the specific surface area measured by nitrogen adsorption manometry and calculated according to the Brunauer, Emmett and Teller model (BET method), after degassing in vacuo at 190° C. for at least 2 hours.

TABLE 2

| Product | BET surface area (m²/g) | BJH pore volume (cm³/g) |
| --- | --- | --- |
| Lime HS | 45.1 | 0.24 |
| Lime STD-1 | 15.9 | 0.08 |
| Lime BS1 | 8.4 | 0.04 |
| Lime BS2 | 7.2 | 0.04 |

A coating is prepared starting from the aforementioned binder by adding siliceous sand, so as to obtain the bulk composition mentioned in table 3.

TABLE 3

| Products | Proportion (% by weight) |
| --- | --- |
| Cement CEM I 42.5 R | 13% |
| Hydrated lime | 12% |
| Reidispersable latex powder (Vinnapas 8031 H) | 0.1% |
| Water retainer (Tylose MH 15000 YP4) | 0.12% |
| Air entrainer (Hostapur OSB) | 0.02% |

TABLE 3-continued

| Products | Proportion (% by weight) |
| --- | --- |
| Hydrophobicizer (Zinkum 5) | 0.3% |
| Siliceous sand (0.1-0.6 mm) | 74.5% |

The mixing rate of the fresh coating (water/Solid, W/S) according to table 3 is adjusted in order to obtain a consistency (slump) of the slurry of 175±5 mm according to the EN1015-3 standard. The characteristics of the coatings are mentioned in table 4. The density of the fresh coating and the entrained air are evaluated according to the EN1015-6 and EN1015-7 standards. Water retention is evaluated with a device according to the ASTM C91 standard with a negative pressure of 7,000 Pa for 15 min, with the same consistency of the slurry (slump of 175±5 mm). Only the water retention value after 15 min is shown.

TABLE 4

| A coating based on | W/S[%] | Slump [mm] | Density | Air [%] | Water retention 15 min [%] |
| --- | --- | --- | --- | --- | --- |
| Lime HS | 28.4 | 178 | 1.7 | 14 | 92 |
| Lime STD-1 | 21.5 | 177 | 1.6 | 18 | 94 |
| Lime BS1 | 21.3 | 170 | 1.5 | 22 | 95 |
| Lime BS2 | 20.4 | 175 | 1.5 | 24 | 96 |

As this may be seen, coatings based on lime with a low specific surface area (BS) have a lower water demand (W/S). It is well known that a low water demand lowers the risk of shrinkage and cracks in the coating, and increases the mechanical strength of a formulation including a hydraulic binder.

It is also observed that lime with a low specific surface area give the possibility to the organic additives of better fulfilling their role of an air entrainer or water retainer. A higher air level gives the fresh coating better plasticity/handling capability, increases its yield, as well as the isolating power and the resistance to freezing/thawing cycles of the hardened coating. Better retention of water of the fresh coating increases its tolerance towards variable supports, and of high porosity.

Let us note that an increase in the water retention beyond 92% is typically very delicate to obtain while maintaining good handling capability. This strong water retention is further highly sought by one skilled in the art.

Example 2.—: Impact of Hydrated Lime with Low Specific Surface Area in an Enhanced Masonry Mortar (II)

The binder composition for a masonry mortar mentioned in table 5 was prepared with the following components and in the indicated proportions:

TABLE 5

| Products | Proportion (% by weight) |
| --- | --- |
| Cement CEM I 42.5 N | 84.4% |
| Slaked lime | 15.4% |
| Air entrainer (Hostapur OSB) | 0.1% |
| Water retainer (Tylose MH 15003 P6) | 0.1% |

In this formulation, a lime with low specific surface area (BS) is compared with a standard lime (STD) with standard specific surface area according to table 6:

TABLE 6

| Product | BET Surface (m²/g) | BJH pore volume (cm³/g) |
|---|---|---|
| Lime STD-3 | 15.2 | 0.08 |
| Lime BS2 | 7.2 | 0.04 |

An enhanced masonry mortar is prepared starting with the aforementioned binder by adding siliceous sand, so as to obtain the bulk composition mentioned in table 7:

TABLE 7

| Products | Proportion (% by weight) |
|---|---|
| Cement CEM I 42.5 N | 11% |
| Slaked lime | 2% |
| Limestone filler | 11% |
| Air entrainer (Hostapur OSB) | 0.01% |
| Water retainer (Tylose MH 15003 P6) | 0.01% |
| Siliceous sand (0.1-1.2 mm) | 76% |

The mixing level of the fresh mortar (Water/Solid, W/S) according to table 5 is adjusted in order to obtain a consistency (slump) of the slurry of 175±5 mm according to the EN1015-3 standard. The characteristics of the mortars are mentioned in table 8.

The density of the fresh mortar and the entrained air are evaluated according to the EN1015-6 and EN1015-7 standards.

Water retention is evaluated with a device according to the ASTM C91 standard with a negative pressure of 7,000 Pa for 15 min, with the same consistency of the slurry. Only the water retention value after 15 min is shown.

TABLE 8

| Mortar based on | W/S [%] | Slump [mm] | Density | Air [%] | Retention of water 15 min [%] |
|---|---|---|---|---|---|
| Lime STD-3 | 14.1 | 173 | 1.8 | 18.0 | 72 |
| Lime BS2 | 13.7 | 176 | 1.6 | 25.0 | 75 |

Again, the lime with low specific surface area (BS) allows the air entrainer and the water retention additive to better fulfill their role with the possibility of optionally reducing their level in the composition or increasing water retention for an equal amount of additives. According to this example, the impact on the air entraining is particularly pronounced and interesting, the impact on the water retention finally being limited because of the low content of water retention additive.

Of course the present invention is by no means limited to the embodiments described above and that many modifications may be provided thereto without departing from the scope of the appended claims.

The invention claimed is:

1. A binder composition for mortars and coatings, comprising a first conventional mineral component and a second component based on powdery slaked lime, wherein said second component based on powdery slaked lime has a specific surface area calculated according to the BET method of less than 12 m²/g and wherein said second component is present in an amount equal to or greater than 12% and equal to or less than 80% by weight, based on the total weight of the binder composition.

2. The binder composition according to claim 1 wherein said second component has a specific surface area calculated according to the BET method of less than 8.5 m²/g.

3. The binder composition according to claim 1, wherein said first conventional mineral component is selected from the group consisting of cements, standard slaked or air lime, natural or artificial hydraulic lime, masonry binders, pozzolanic and hydraulic binders, gypsum and mixtures thereof.

4. The binder composition according to claim 3, wherein said cement is selected from the group consisting of common cements, refractory cements, molten aluminous cements, prompt cements, Portland cements, slags from blast furnaces, fly ash and mixtures thereof.

5. The binder composition according to claim 1, wherein said second component has particles having a d3 greater than 0.1 μm and a d98 of less than or equal to 250 μm.

6. The binder composition according to claim 1, wherein said second component has particles having a d93 of less than or equal to 90 μm.

7. The binder composition according to claim 1, wherein said second component based on powdery slaked lime has a total pore volume calculated according to the BJH method of nitrogen desorption greater than or equal to 0.02 cm³/g.

8. The binder composition according to claim 1, wherein said second component based on powdery slaked lime has a total pore volume calculated according to the BJH method of nitrogen desorption of less than or equal to 0.07 cm³/g.

9. The binder composition according to claim 1, further comprising an air entrainer comprising a surfactant or tenside.

10. The binder composition according to claim 1, further comprising a water retaining agent, the water retaining agent being selected from the group consisting of cellulose ethers, guar gums, derivatives thereof and mixtures thereof.

11. The binder composition according to claim 1, further comprising a rheology modifier comprising a hydrocolloid.

12. The bind composition according to claim 1, further comprising a hydrophobicizing agent selected from the group consisting of salts of fatty acids including stearates and oleates, vegetable and mineral oils, silanes, siloxanes and mixtures thereof.

13. The binder composition according to claim 1, further comprising a third component which is organic and which comprises an industrial lattice selected from the group consisting of copolymers based on polyvinyl acetate/ethylene, polyvinyl acetate/versatate, and styrene/butadiene.

14. The binder composition according to claim 1, wherein said second component based on slaked lime has a bulk density measured according to the EN 459 2 standard of more than 350 kg/m³.

15. A system of coatings or mortars comprising an aggregate of the mineral type and a binder composition, the binder composition comprising:
   a first conventional mineral component and a second component based on powdery slaked lime, wherein said second component based on powdery slaked lime has a specific surface area calculated according to the BET method of less than 12 m²/g wherein said second component is present in an amount equal to or greater than 12% and equal to or less than 80% by weight, based on the total weight of the binder composition.

16. The system according to claim 15, in a dry form, ready to be mixed with water.

17. The system according to claim 15, further comprising water.

18. The system according to claim 15, further comprising an air entrainer comprising a surfactant or tenside.

19. The system according to claim 15, further comprising a water retaining agent, the water retaining agent being selected from the consisting of cellulose ethers, guar gums, derivatives thereof and mixtures thereof.

20. The system according to claim 15, further comprising a rheology modifier which comprises a hydrocolloid.

21. The system according to claim 15, further comprising a hydrophobicizing agent which comprises the salt of a fatty acid, the hydrophobicizing agent being selected from the group consisting of stearates and oleates, vegetable and mineral oils, silanes, siloxanes and mixtures thereof.

22. The system according to claim 15, further comprising a third component which is organic and which comprises an industrial lattice the industrial lattice being selected from the group consisting of lattices based on polyvinyl/ethylene, polyvinyl acetate/versatate, styrene/butadiene copolymers.

23. The binder composition according to claim 1, further comprising an air entrainer, the air entrainer being selected from the group consisting of alkyl sulfates, alkyl sulfonates, ethoxylated fatty alcohols, block copolymers and mixtures thereof.

24. The binder composition according to claim 1, further comprising a rheology modifier, the rheology modifier being selected from the group consisting of polysaccharides, starch derivatives, alginates, guar gums and derivatives thereof, xanthan gums and derivatives thereof, carrageenan gums and derivatives thereof, succinoglycans, superplasticizers selected from the group consisting of polycarboxylates and melamine formaldehydes, and mineral colloids selected from the group consisting of silica and clays, and mixtures thereof.

25. The system according to claim 15, further comprising an air entrainer, the air entrainer being selected from the group consisting of alkyl sulfates and alkyl sulfonates, ethoxylated fatty alcohols, block copolymers and mixtures thereof.

26. The system according to claim 15, further comprising a rheology modifier, the rheology modifier being selected from the group consisting of polysaccharides, starch derivatives, alginates, guar gums and derivatives thereof xanthan gums and derivatives thereof, carrageenan gums and derivatives thereof, succinoglycans, superplasticizers selected from the group consisting of polycarboxylates and melamine formaldehydes, and mineral colloids selected from the group consisting of silica and clays, and mixtures thereof.

* * * * *